United States Patent
Iwata et al.

(10) Patent No.: US 7,127,673 B2
(45) Date of Patent: Oct. 24, 2006

(54) ELECTRONIC DOCUMENT DISPLAY SYSTEM

(75) Inventors: Satoshi Iwata, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 376 days.

(21) Appl. No.: 09/741,025

(22) Filed: Dec. 21, 2000

(65) Prior Publication Data
US 2001/0004256 A1 Jun. 21, 2001

(30) Foreign Application Priority Data
Dec. 21, 1999 (JP) .................... 11-363103

(51) Int. Cl.
*G06F 17/24* (2006.01)
*G06F 3/00* (2006.01)

(52) U.S. Cl. ............... 715/517; 715/520; 715/530; 715/790

(58) Field of Classification Search ............. 715/517, 715/518, 515, 520, 788, 526, 530, 529, 513, 715/790
See application file for complete search history.

(56) References Cited

U.S. PATENT DOCUMENTS

| | | | |
|---|---|---|---|
| 5,669,006 A * | 9/1997 | Joskowicz et al. ......... 715/517 |
| 6,023,714 A * | 2/2000 | Hill et al. ................ 715/513 |
| 6,388,684 B1 * | 5/2002 | Iwamura et al. .......... 345/788 |
| 6,430,624 B1 * | 8/2002 | Jamtgaard et al. ........ 709/246 |
| 6,456,305 B1 * | 9/2002 | Qureshi et al. ........... 345/800 |
| 6,457,030 B1 * | 9/2002 | Adams et al. ............ 715/523 |
| 6,907,576 B1 * | 6/2005 | Barbanson et al. ....... 715/791 |

OTHER PUBLICATIONS

HTML 4.0 Specification W3C Recommendation, revised on Apr. 24, 1998 http://www.w3.org/TR/1998/REC-html40-19980424/and http://www.w3.org/TR/1998/REC-html40-19980424/struct/global.html#h-7.5.2.*

* cited by examiner

*Primary Examiner*—Stephen S. Hong
*Assistant Examiner*—Adam L Basehoar
(74) *Attorney, Agent, or Firm*—Staas & Halsey LLP

(57) ABSTRACT

In a display system and a display control method according to the present invention, a display specification data, which represents specifications of a display unit, is detected. A layout data of a document data is detected, the layout data being integrally stored with the document data and representing a page layout of data elements of the document data that are displayed on the display unit. The display unit is controlled such that the document data is displayed on the display unit in conformity with the detected display specification data and the detected layout data.

15 Claims, 17 Drawing Sheets

---

LAYOUT DATA (L/D)
- LAYOUT INFORMATION
- DATA ELEMENT
- DATA ELEMENT POSITION
- PAGE FORMAT DATA

TEXT DATA (T/D)
- FONT SIZE
- FONT TYPE
- CHARACTER COLOR
- CHARACTER PITCH

IMAGE DATA (I/D)
- IMAGE FILE TYPE
- IMAGE SIZE

FIG.17
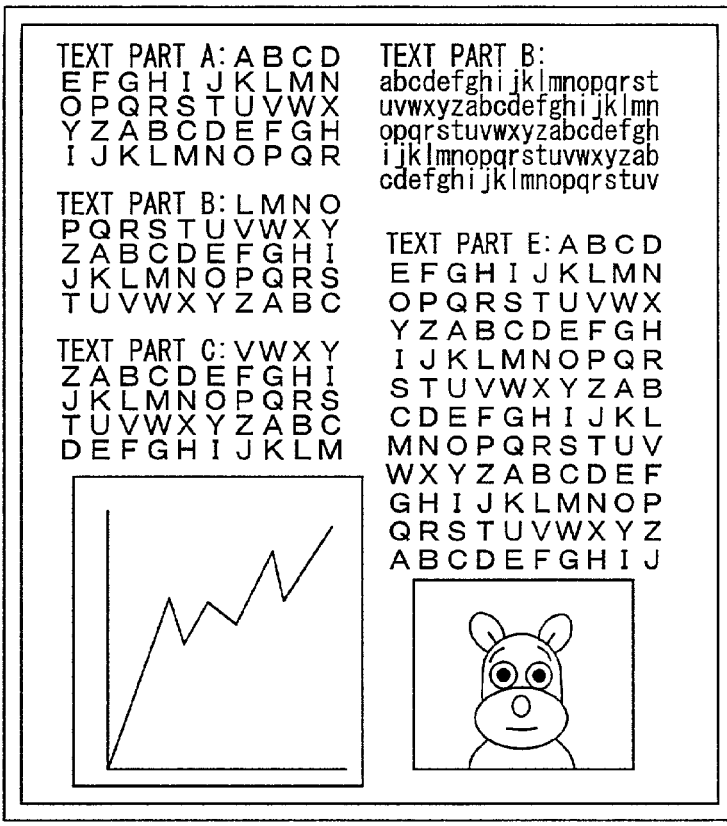
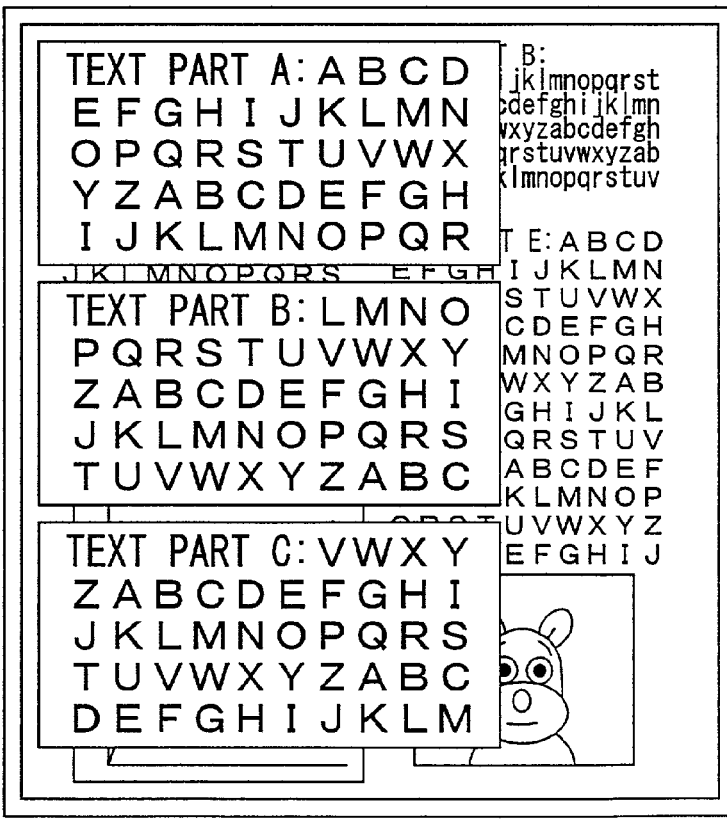

ELECTRONIC DOCUMENT DISPLAY SYSTEM

This application claims priority to Japanese Priority Application No. 11-363103 filed Dec. 21, 1999, the entire contents of which are herein incorporated by reference.

BACKGROUND OF THE INVENTION

1. Field of the Invention

The present invention relates to a portable display system in which document data, such as electronic document or electronic magazine, is displayed on a display unit. The present invention relates to a display control method that controls the display system. Further, the present invention relates to a computer readable medium that stores display control program code instructions for use in the display system.

2. Description of the Related Art

A portable display system in which a document data, including characters and images, is displayed on a display unit, such as a liquid crystal display, is known. The proliferation of such portable display systems is increasing with development of a large-size liquid-crystal display and reduction of the cost. By using a portable display system, the user can easily display and view the information of electronic documents or electronic magazines, on the screen of the display unit.

For example, the electronic document format and the EPWing format are commonly used when displaying a text-based electronic document on the display unit. When displaying text data in the electronic document format, the frame of a viewer software package, which is configured to be analogous with a book, appears on the screen of the display unit. The original text data is converted into a processed document data using preset character fonts of the viewer software, and the processed document data is displayed. The electronic document format is primarily used when displaying text-based electronic documents. The EPWing format is similar to the electronic document format. When displaying text data in the EPWing format, the frame of a viewer software package appears on the screen of the display unit. The viewer software package is provided with a search engine. A desired part of electronic document is searched from the original text data, and the obtained part is converted into a processed document data, and the processed document data is displayed. The EPWing format is primarily used when displaying text-based electronic dictionaries.

On the other hand, when displaying a document data in which characters and images, such as drawings or illustrations, coexist, the PDF (portable document format) is frequently used. The PDF is a well-known file format for creating and viewing documents, which is originally developed to standardize Internet-based documents. The PDF file format includes the document data with data elements arranged according to a page layout. The document data with the page layout is visualized on the display unit. The PDF is primarily used when displaying text/image-mixed electronic magazines, including the document design, the page layout and the image data, on the screen of the display unit.

However, when an electronic document or electronic magazine is displayed using a portable display system, the screen of the display unit in the portable display system is too small in size to clearly view the details of the electronic document. When the entire document data with the original display size is selected on the portable display system, it is often difficult for the user to view the fine characters in the document data on the display unit.

Further, when an enlarged view of the document data is selected on the portable display system, the entire document data is enlarged on the display unit. In order to find out a desired part of the document data, it is necessary for the user to shift or scroll the enlarged view on the display unit by additionally manipulating the display system, which will be detrimental to the portability of the display system. In addition, when the enlarged view of the document data is displayed on the screen of the display unit, the entire document data with the original display size does not appear simultaneously with the enlarged view, which lowers the document displaying capabilities of the display system.

SUMMARY OF THE INVENTION

Accordingly, it is an object of the present invention to provide an improved display system in which the above-described problems are eliminated.

Another object of the present invention is to provide a display system in which the document displaying capabilities and the portability are improved.

Another object of the present invention is to provide a method of controlling a display system, in which the document displaying capabilities and the portability are improved.

Another object of the present invention is to provide a storage medium storing program code instructions to cause the computer to control a display system, in which the document displaying capabilities and the portability are improved.

The above-mentioned objects of the present invention are achieved by a display system in which a document data is displayed on a display unit, the display system including: a display specification detection unit which detects a display specification data, the display specification data representing specifications of the display unit; a layout data detection unit which detects a layout data of the document data, the layout data being integrally stored with the document data and representing a page layout of data elements of the document data that are displayed; and a display control unit which controls the display unit such that the document data is displayed on the display unit in conformity with the detected display specification data and the detected layout data.

The above-mentioned objects of the present invention are achieved by a method of controlling a display system in which a document data is displayed on a display unit, the method including the steps of: detecting a display specification data, the display specification data representing specifications of the display unit; detecting a layout data of the document data, the layout data being integrally stored with the document data and representing a page layout of data elements of the document data that are displayed; and controlling the display unit such that the document data is displayed on the display unit in conformity with the detected display specification data and the detected layout data.

The above-mentioned objects of the present invention are achieved by a computer readable medium storing program code for causing a processor to control a display system in which a document data is displayed on a display unit, the computer readable medium including: a first program code unit that causes the processor to detect a display specification data, the display specification data representing specifications of the display unit; a second program code unit that causes the processor to detect a layout data of the document data, the layout data being integrally stored with the document data and representing a page layout of data elements of the document data being displayed; and a third program code unit that causes the processor to control the display unit such that the document data is displayed on the display unit in conformity with the detected display specification data and the detected layout data.

In the display system and the display control method according to the present invention, the page layout processing is carried out for the data elements of the document data by a CPU such that the data elements are allocated on the screen of the display unit in conformity with the layout data that is detected from the document data. Therefore, the display system and the display control method of the present invention are effective in improving the document displaying capabilities and the portability.

BRIEF DESCRIPTION OF THE DRAWINGS

Other objects, features and advantages of the present invention will become apparent from the following detailed description when read in conjunction with the accompanying drawings.

FIG. 9 is a diagram for explaining another display screen switching of the display system of the third preferred embodiment.

FIG. 16 is a diagram for explaining a data element layer display control processing of a seventh preferred embodiment of the display system of the invention.

FIG. 17 is a diagram for explaining another data element layer display control processing of the display system of the seventh preferred embodiment.

DETAILED DESCRIPTION OF PREFERRED EMBODIMENTS

A description will now be provided of the preferred embodiments of the present invention with reference to the accompanying drawings.

Figure 1:
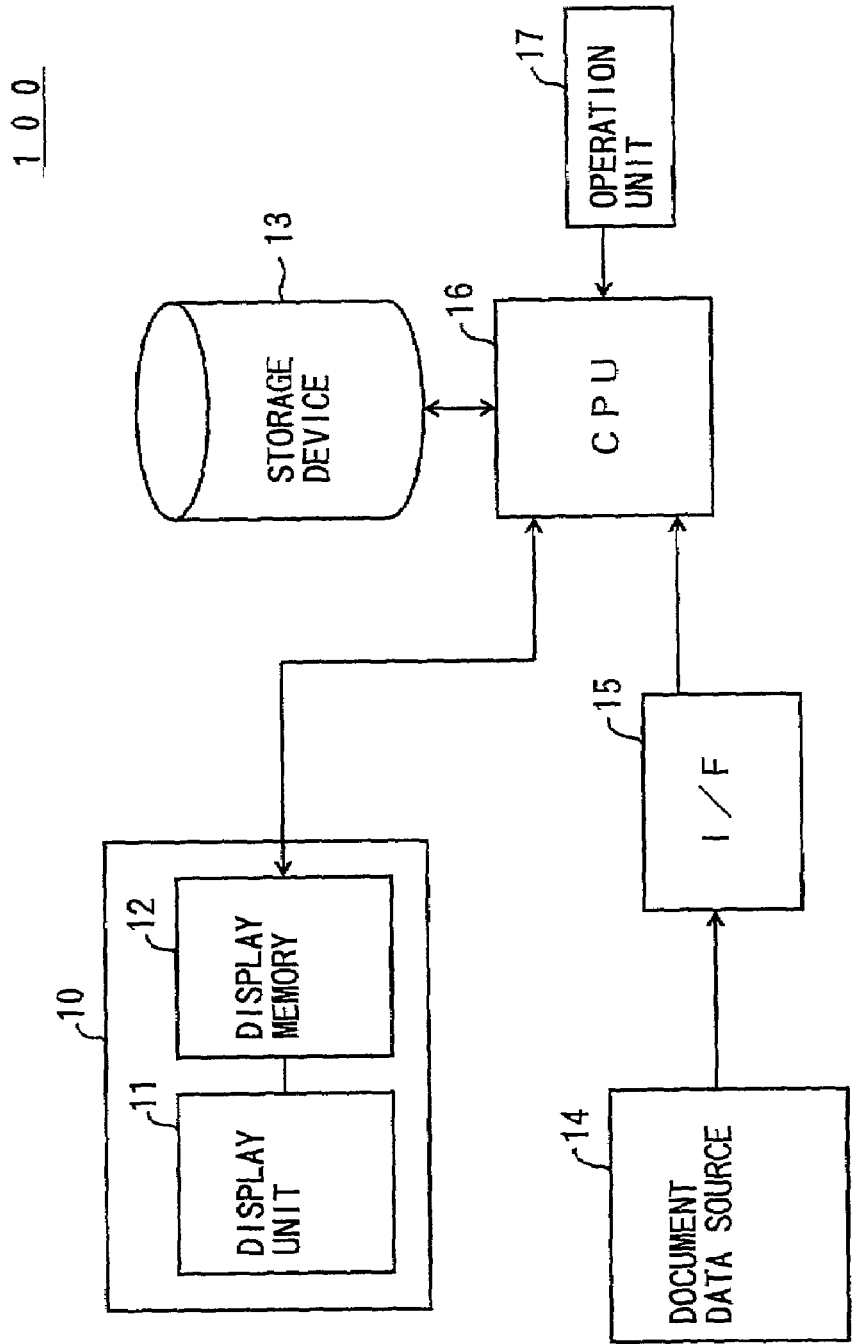
FIG. 1 is a block diagram of a display system to which a first preferred embodiment of the invention is applied.

FIG. 1 shows a display system 100 to which a first preferred embodiment of the invention is applied.

As shown in FIG. 1, the display system 100 generally includes a display device 10, a storage device 13, a document data source 14, an interface (I/F) 15, a CPU (central processing unit) 16, and an operation unit 17. In the display device 10, a display unit 11 and a display memory 12 are provided, and they are connected together. The CPU 16 supplies a processed document data to the display memory 12 in the display device 10. The processed document data is stored in the display memory 12, and the document data is displayed or visualized on the display unit 11.

The CPU 16 creates a processed document data that is supplied to the display device 10. An original document data is produced at the document data source 14 through a DTP (desktop publishing) technique. The CPU 16 receives the original document data from the document data source 14 via the interface 15. A display specification data, including a display screen size and a display resolution related to the display unit 11, is stored in the storage device 13. The CPU 16 produces a processed document data from the original document data in conformity with the display specification data stored in the storage device 13. The processed document data produced by the CPU 16 is stored in the storage device 13. The processed document data that is stored in the storage device 13 is comprised of a layout data, text data elements, and image data elements, which will be described later. When displaying the document data, the CPU 16 receives the processed document data from the storage device 13, and supplies the processed document data to the display memory 12 in the display device 10. The user is allowed to input, from the operation unit 17, a request for changing the display specification data related to the display unit 11, to the CPU 16. In response to the request, the CPU 16 performs a display specification changing procedure in which the display specification data stored in the storage device 13 is changed accordingly.

As described above, in the display system 100 of FIG. 1, the CPU 16 produces a processed document data from the original document data in conformity with the display specification data stored in the storage device 13. The processed document data produced by the CPU 16 is stored in the storage device 13. When displaying the document data, the CPU 16 receives the processed document data from the storage device 13, and supplies the processed document data to the display memory 12 in the display device 10, so that the document data is displayed on the display unit 11 in conformity with the display specification data and the layout data.

Figure 2:
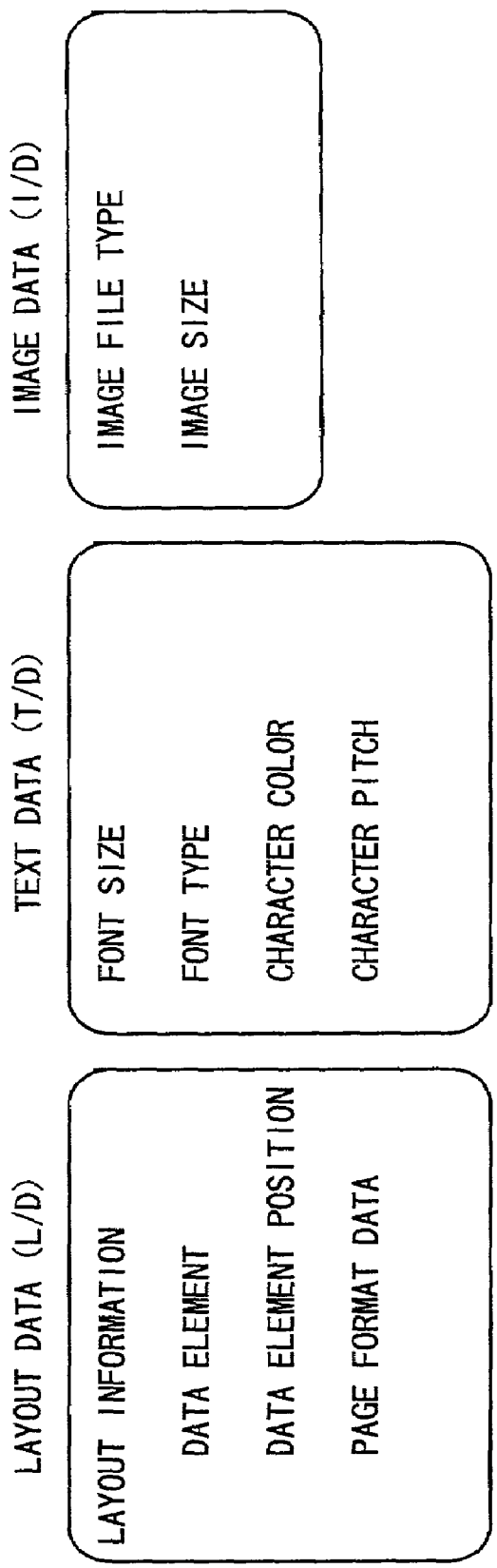
FIG. 2 is a diagram for explaining the details of a document data in the first preferred embodiment.

FIG. 2 shows the details of a document data in the first preferred embodiment. As shown in FIG. 2, the document data is comprised of a layout data (L/D), text data elements (T/D), and image data elements (I/D). In the display system of the present embodiment, the layout data is stored in the storage device 13 integrally with the document data. The layout data contains layout information of the document data, and this layout information is provided when the original document data is produced through the DTP technique at the document data source 14. The layout information is comprised of data element identifiers, data element positions, and page format data of the respective data elements contained in the document data. The layout of the data elements of the document data on the display screen of the display unit 11 is set by the layout information.

The text data elements, contained in the document data, are comprised of a font size, a font type, a character color, and a character pitch. The details of the text data, displayed on the display unit 11, are set in accordance with these data elements. The image data elements, contained in the document data, are comprised of an image file type and an image size. The details of the image data, displayed on the display unit 11, are set in accordance with these data elements. In the display system of the present embodiment, the document data is displayed on the display unit 11 in accordance with these data elements, regardless of the device type or the internal setting of the display unit 11.

Figure 3:
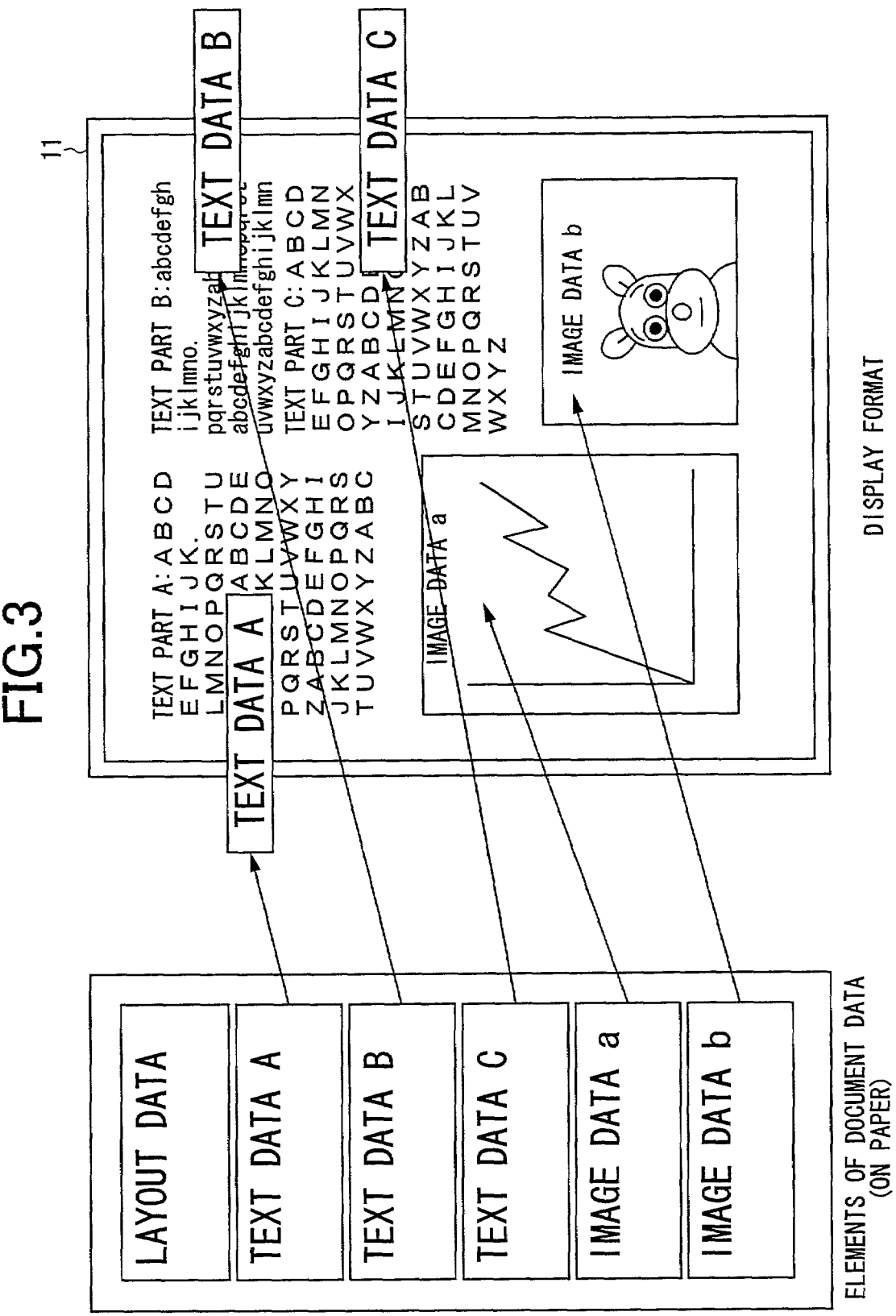
FIG. 3 is a diagram showing an example of the document data and the display format in the first preferred embodiment.

FIG. 3 shows an example of the document data and the display format in the first preferred embodiment of the display system. As shown in FIG. 3, the document data of this example is aimed at a printed material in which text data and image data coexist. When printing the document data of this example, a layout data, a text data "A", a text data "B", a text data "C", an image data "a" and an image data "b" are printed on paper in this order. The display format of the document data that corresponds to the printing format is also shown in FIG. 3. When the document data of this example is displayed on the display unit 11, the text data "A" is allocated at the top of the left column, the text data "B" is allocated at the top of the right column, the text data "C" is allocated in the middle of the right column, the image data "a" is allocated at the bottom of the left column, and the image data "b" is allocated at the bottom of the right column.

In the display system and the display control method of the above-described embodiment, the page layout processing is carried out for the text/image data elements of the document data by the CPU 16 such that the text/image data elements are allocated on the screen of the display unit 11 in conformity with the layout data that is detected from the document data. Hence, the display system and the display control method of the present embodiment are effective in improving the document displaying capabilities and the portability.

Figure 4:
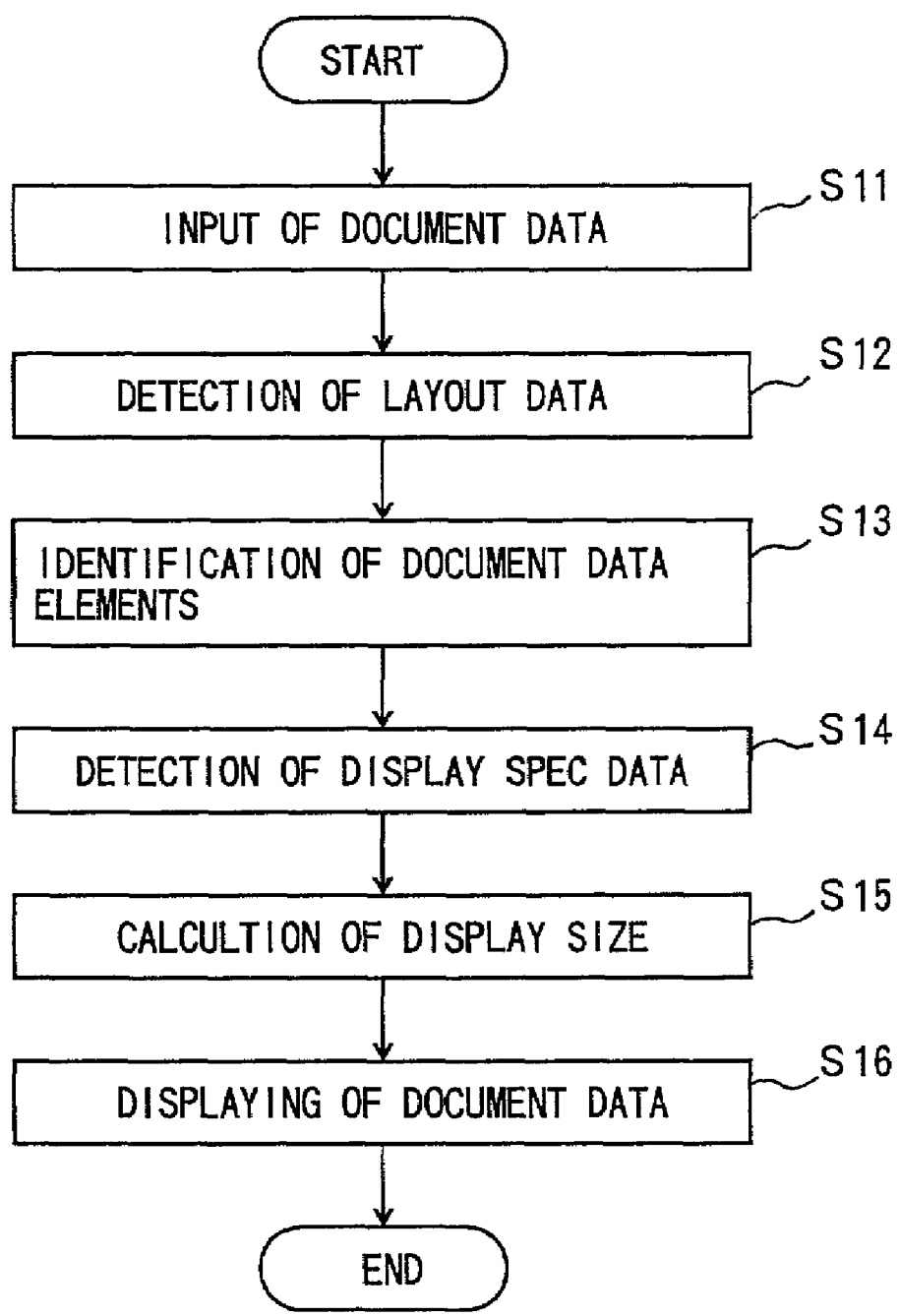
FIG. 4 is a flowchart for explaining a display size processing routine executed by a second preferred embodiment of the display system of the invention.

FIG. 4 is a flowchart for explaining a display size processing routine of a second preferred embodiment of the display system of the invention.

In the present embodiment, the elements of the display system are essentially the same as the corresponding elements of the display system shown in FIG. 1, and a description thereof will be omitted. The display size processing routine of FIG. 4 is constituted by program code instructions stored in a memory of the CPU 16 or the storage device 13. In the present embodiment, the memory of the CPU 16 or the storage device 13 corresponds to the computer readable medium in the claims. Alternatively, other types of computer usable devices and media may be used as the computer readable medium in the claims. Further, in the display system of the present embodiment, the program code instructions, stored in the memory of the CPU 16 or the storage device 13 (the computer readable medium), cause the CPU 16 to execute the display size processing routine of FIG. 4.

As shown in FIG. 4, at a start of the display size processing routine, the CPU 16 at step S11 inputs an original document data that is received from the document data source 14. After the document data is inputted, the CPU 16 at step S12 detects the layout data from the document data. After the layout data is detected, the CPU 16 at step S13 identifies the text/image data elements of the document data. After the text/image data elements are identified, the CPU 16 at step S14 detects the display specification data that is stored in the storage device 13.

The CPU 16 at step S15 calculates a display size that is appropriate for the text data elements to be readable on the screen of the display unit 11, based on the detected display specification data (step S14) and the detected layout data (step S13). For example, when displaying an A4-size document (electronic magazine) on a portable display system having the specifications of 180-dpi resolution and 8-inch size, it is necessary to enlarge the original display size to a display size that is appropriate to make the document data, displayed on the display unit 11, readable to the user. In such a case, if the document data is displayed with the original display size (no enlargement), the displayed document with the original display size will be less readable to the user. To eliminate this problem, the CPU 16 at step S15 calculates the appropriate display size based on the detected display specification data and the detected layout data.

After the step S15 is performed, the CPU 16 at step S16 produces a processed document data that reflects the display size calculated at the step S15, and stores the resulting document data into the storage device 13. Further, in the step S16, the CPU 16 receives the processed document data from the storage device 13, and supplies the processed document data to the display memory 12 in the display device 10, so that the document data is displayed on the display unit 11 in conformity with the display specification data and the layout data.

Figure 5:
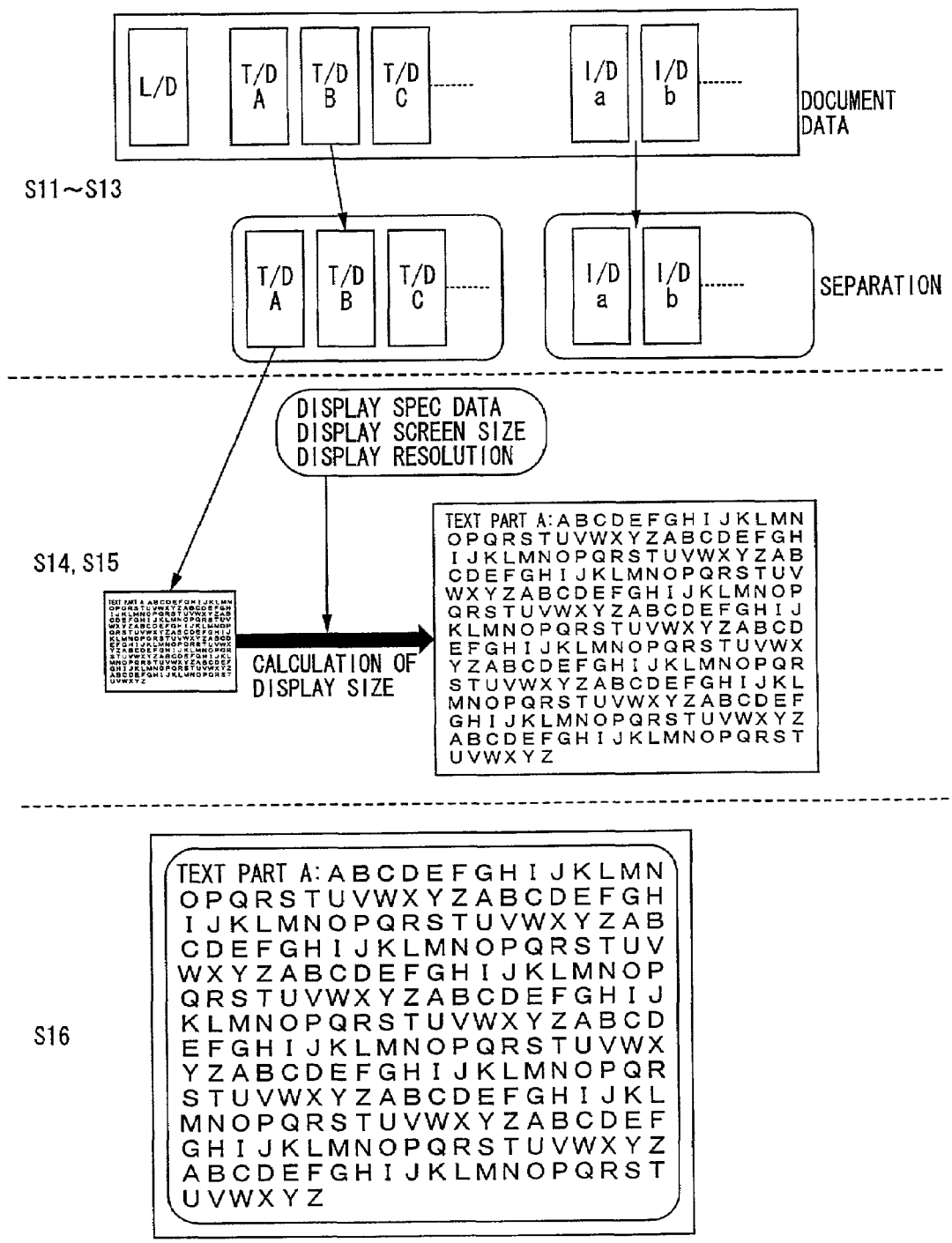
FIG. 5 is a diagram for explaining the display size processing routine of the second preferred embodiment.

FIG. 5 is a diagram for explaining the display size processing routine of the present embodiment. As shown in FIG. 5, in the steps S11 through S13 of the routine of FIG. 4, the CPU 16 detects the layout data from the document data, and identifies the respective text/image data elements of the document data from the detected layout data. Suppose that, in the example of FIG. 5, the document data includes the text data elements "A" through "C" and the image data elements "a" and "c". In the step S13, the CPU 16 separates the image data elements "a" and "c" from the text data elements "A" through "C". In the present embodiment, the CPU 16 takes no action for the image data elements "a" and "c".

Suppose that, in the example of FIG. 5, the text data element "A" is selected by the user from among the text data elements "A" through "C". With respect to the selected one of the text data elements "A" through "C", the CPU 16 performs the steps S14 and S15. The CPU 16 at the step S14 detects the display specification data that is stored in the storage device 13. The display specification data detected at the step S14 includes a display screen size and a display resolution related to the display unit 11. The CPU 16 at the step S15 calculates a display size that is appropriate for the text data element "A" to be readable on the screen of the display unit 11, based on the detected display specification data and the detected layout data.

After the calculation of the display size at the step S15 is performed, the CPU 16 at the step S16 controls the display device 10 so that the text data element "A" is displayed on the display unit 11 in conformity with the display size calculated at the step S15. In the example of FIG. 5, the original display size is enlarged, as shown, to the appropriate display size that is calculated at the step S15.

In the display system of the above-described embodiment, when the user selects a desired one of the text data elements of the document data for displaying, it is possible to provide an enlarged view of the selected data element on the display unit 11 for increasing the readability of the displayed document to the user. Hence, the display system of the present embodiment is effective in improving the document displaying capabilities and the portability.

In the display system of the above-described embodiment, the user is allowed to input, from the operation unit 17, a request for changing the display specification data related to the display unit 11, to the CPU 16. In response to the request, the CPU 16 performs a display specification changing procedure in which the display specification data stored in the storage device 13 is changed accordingly. For example, the display specification data may be modified so as to include a display resolution or a display screen size of the display unit 12 of the user's desired type. Hence, the display system of the present embodiment is effective in improving the document displaying capabilities and the portability.

Figure 6:
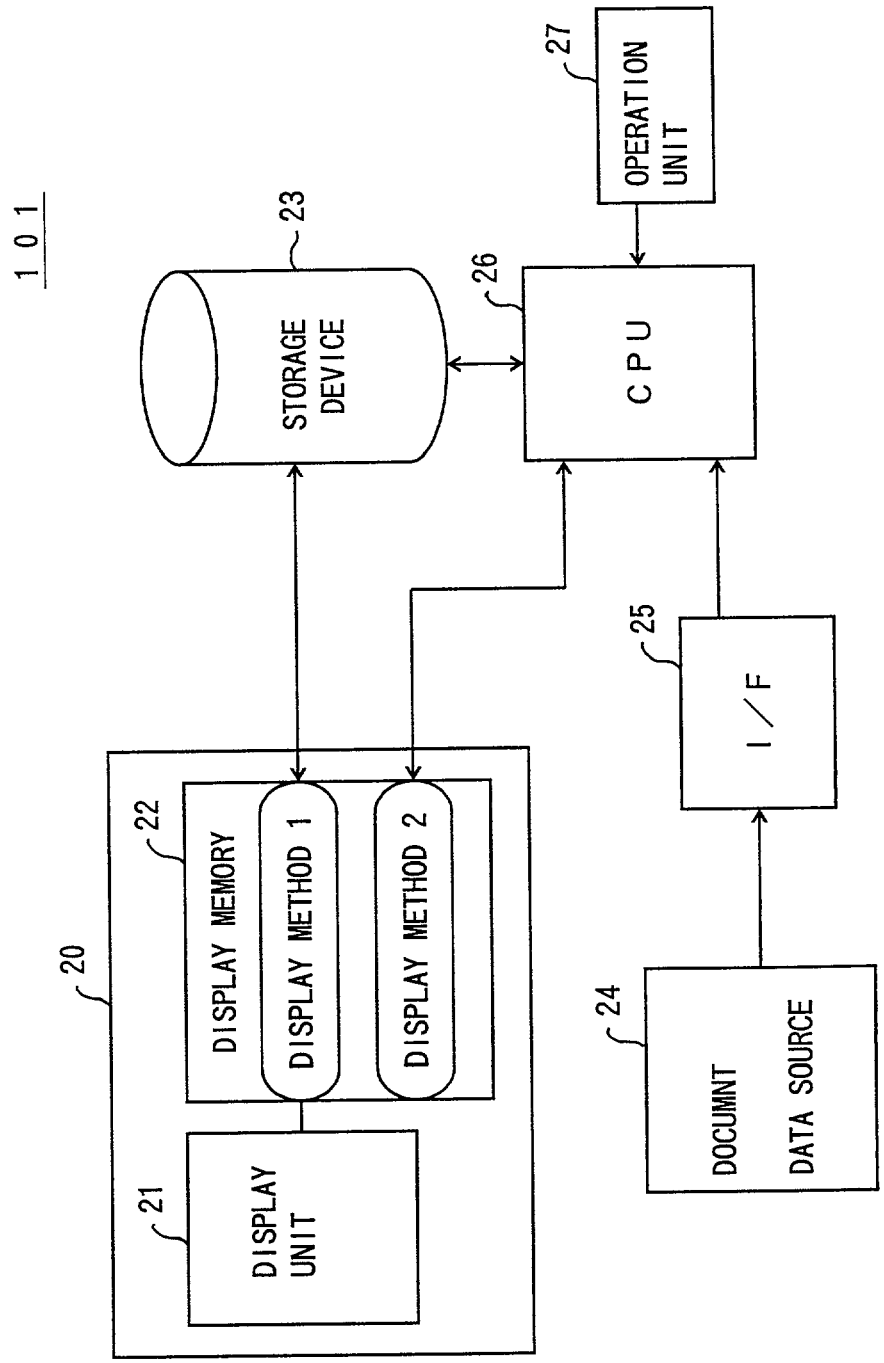
FIG. 6 is a block diagram of a display system to which a third preferred embodiment of the invention is applied.

Next, FIG. 6 shows a display system 101 to which a third preferred embodiment of the invention is applied.

As shown in FIG. 6, the display system 101 generally includes a display device 20, a storage device 23, a document data source 24, an interface (I/F) 25, a CPU (central processing unit) 26, and an operation unit 27. In the display device 20, a display unit 21 and a display memory 22 are provided, and they are connected together.

In the display system 101 of the present embodiment, the storage device 23 supplies an original document data (which is called the display-method1 document data) to the display memory 22. The CPU 26 supplies a processed document data (which is called the display-method2 document data) to the display memory 22. Both the display-method1 document data and the display-method2 document data are stored in the display memory 22, and switching between the display method1 and the display method2 is possible. A selected document data (one of the display-method1 document data and the display-method2 document data) is displayed on the display unit 21 according to the user's demand. The user is allowed to input, from the operation unit 27, the demand for selection of the document data to the CPU 26.

Similar to the embodiment of FIG. 1, in the present embodiment, a display specification data, including a display screen size and a display resolution related to the display unit 21, is stored in the storage device 23. The user is allowed to input, from the operation unit 27, a request for changing the display specification data related to the display unit 21, to the CPU 26. In response to the request, the CPU 26 performs a display specification changing procedure in which the display specification data stored in the storage device 23 is changed accordingly.

In the display system 101 of the present embodiment, an original document data is produced at the document data source 24 through the DTP technique. The CPU 26 receives the original document data from the document data source 24 via the interface 25, and supplies the original document data to the storage device 23, so that the original document data is temporarily stored in the storage device 23 as the display-method1 document data. When the display method1 is selected according to the user's demand, the CPU 26 controls the display device 20 so that the display-method1 document data is displayed on the display unit 21, with the original size, in conformity with the display specification data stored in the storage device 23.

Similar to the embodiment of FIG. 4, the CPU 26 in the present embodiment produces a processed document data from the original document data in conformity with the display specification data stored in the storage device 23 and the layout data contained in the document data. A particular one of the text data elements of the original document data is selected by the user. The calculation of the display size, which is similar to the step S15 of the routine of FIG. 4, is performed for the selected data element. The thus processed document data produced by the CPU 26 is supplied to the storage device 23 so that the processed document data (the display-method2 document data) is temporarily stored in the storage device 23 as the display-method2 document data. When the display method2 is selected according to the user's demand, the CPU 26 receives the processed document data from the storage device 23, and supplies the processed document data to the display memory 22 in the display device 20. The CPU 26 controls the display device 20 so that the selected data element (the display-method2 document data) is displayed on the display unit 21 in conformity with the display size calculated.

As described above, in the display system 101 of FIG. 6, the user is allowed to input, from the operation unit 27, a demand for selection of the document data to the CPU 26. The CPU 26 selects one of the display-method1 document data and the display-method2 document data in response to the user input, and controls the display device 20 so that the selected one of the display-method1 document data and the display-method2 document data is displayed on the display unit 21. Therefore, the display system and the display control method of the present embodiment are effective in improving the document displaying capabilities.

Figure 7:
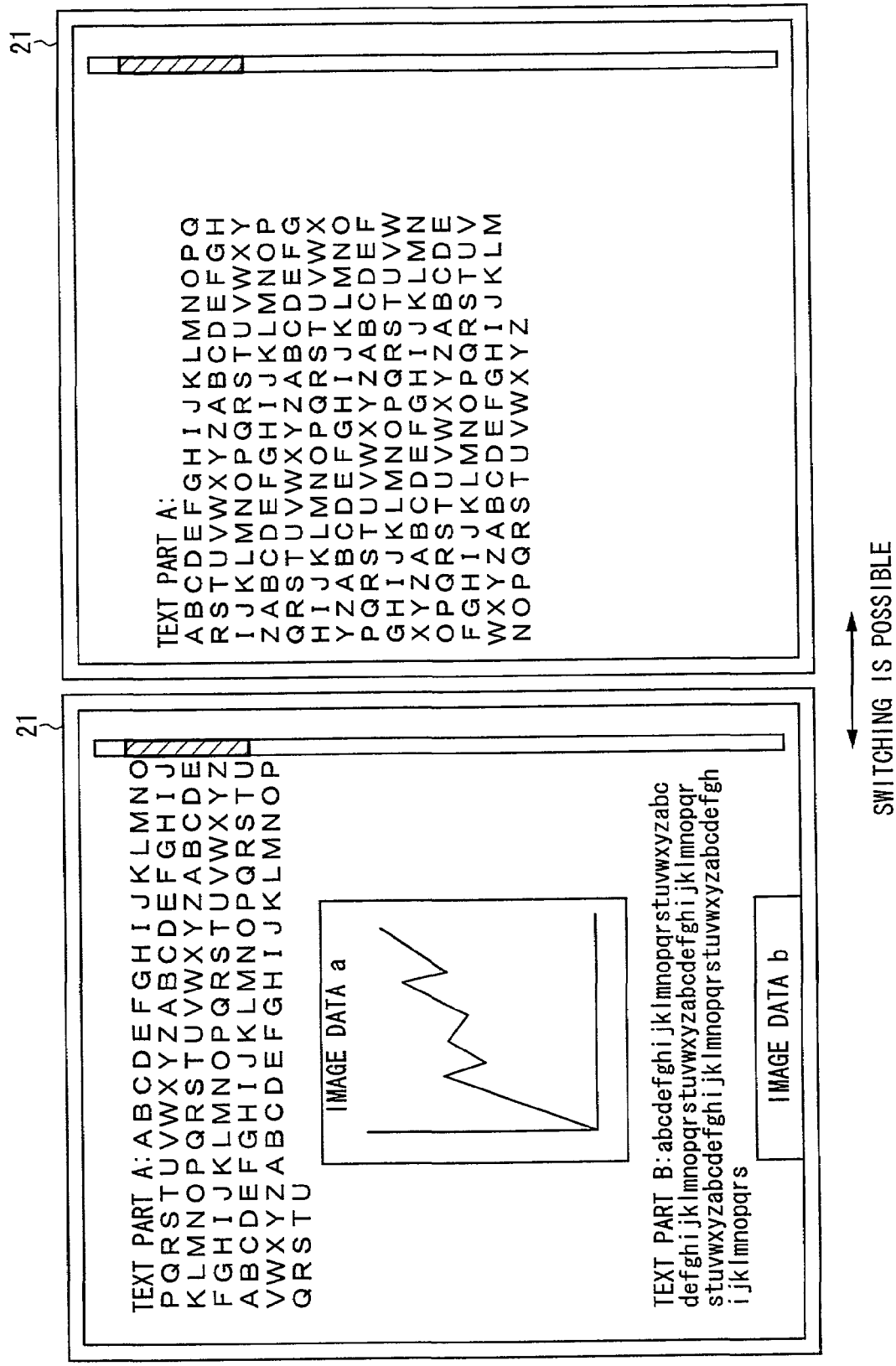
FIG. 7 is a diagram for explaining a display screen switching of the display system of the third preferred embodiment.

FIG. 7 is a diagram for explaining a display screen switching of the display system 101 of the third preferred embodiment. As shown in FIG. 7, in a display example on the left side, the original document data with an original display size (with no enlargement/reduction) is displayed on the display unit 21, which is according to the display method1. In a display example on the right side of FIG. 7, one of the text data elements "A", "B" and "C" of the document data is selected according to the user's demand, and the CPU 26 controls the display unit 21 such that the selected text data element "A" is displayed with a calculated display size (or the enlarged view) on the display unit 21, which is according to the display method2.

In the present embodiment, the user is allowed to input, from the operation unit 27, a demand for selection of the document data to the CPU 26. In the display system 101 of the present embodiment, the switching between the display-method1 document data and the display-method2 document data is possible for the displaying of the selected document data on the screen of the display unit 21. The display system and the display control method of the present embodiment are appropriate for displaying electronic documents or images described by XML (extensible markup language) or other markup languages, on the screen of the display unit 21.

Figure 8:
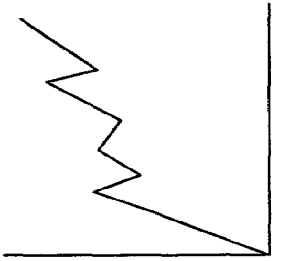
FIG. 8 is a diagram for explaining another display screen switching of the display system of the third preferred embodiment.

FIG. 8 is a diagram for explaining another display screen switching of the display system 101 of the third preferred embodiment. As shown in FIG. 8, in a display example on the left side, the entire document data with a calculated display size (or the reduced view) is displayed on the display unit 21, which is according to the display method1. In a display example on the right side of FIG. 8, one of the text data elements "A", "B" and "C" of the document data is selected according to the user's demand, and the CPU 26 controls the display unit 21 such that the selected text data element "A" is displayed with a calculated display size (or the enlarged view) on the display unit 21, which is according to the display method2.

In the present embodiment, the user is allowed to input, from the operation unit 27, a demand for selection of the document data to the CPU 26. In the display system 101 of the present embodiment, the switching between the display-method1 document data and the display-method2 document data is possible for the displaying of the selected document data on the screen of the display unit 21. The display system and the display control method of the present embodiment are appropriate for displaying electronic documents or images in the PDF format or the like, on the screen of the display unit 21.

Figure 9:
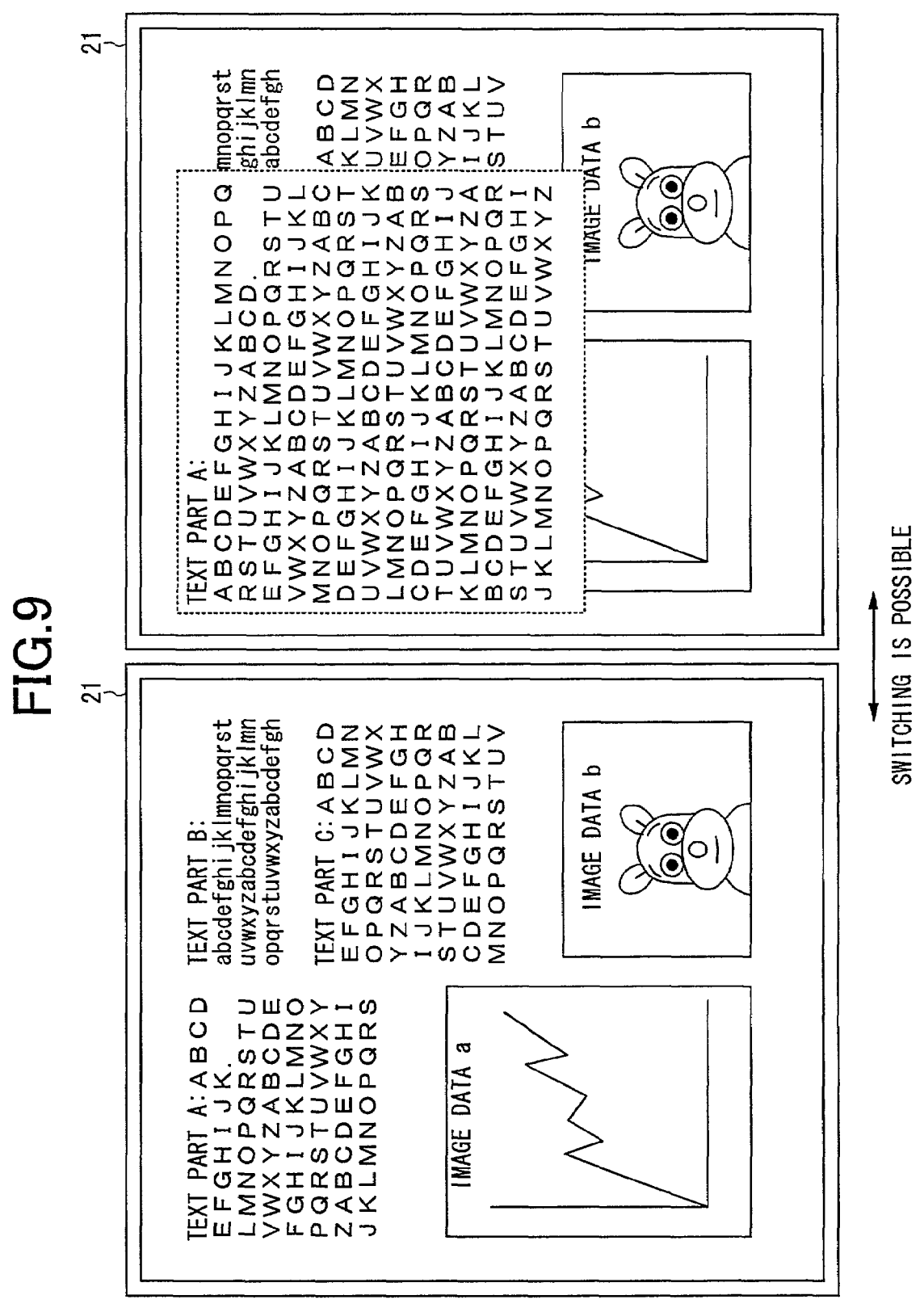

FIG. 9 is a diagram for explaining another display screen switching of the display system 101 of the third preferred embodiment. As shown in FIG. 9, in a display example on the left side, the entire document data with a calculated display size (or the reduced view) is displayed on the display unit 21, which is according to the display method1. In a display example on the right side of FIG. 9, one of the text data elements "A", "B" and "C" of the document data is selected according to the user's demand, and the CPU 26 controls the display unit 21 such that an image of the selected text data element "A", which is overlapped over a background image of the entire document data with the calculated display size (or the reduced view), is displayed with the calculated display size (or the enlarged view) on the display unit 21, which is according to the display method2.

In the present embodiment, the user is allowed to input, from the operation unit 27, a demand for selection of the document data to the CPU 26. In the display system 101 of the present embodiment, the switching between the display-method1 document data and the display-method2 document data is possible for the displaying of the selected document data on the screen of the display unit 21. The display system and the display control method of the present embodiment are appropriate for displaying electronic documents or images in the PDF format or the like, on the screen of the display unit 21.

Figure 10:
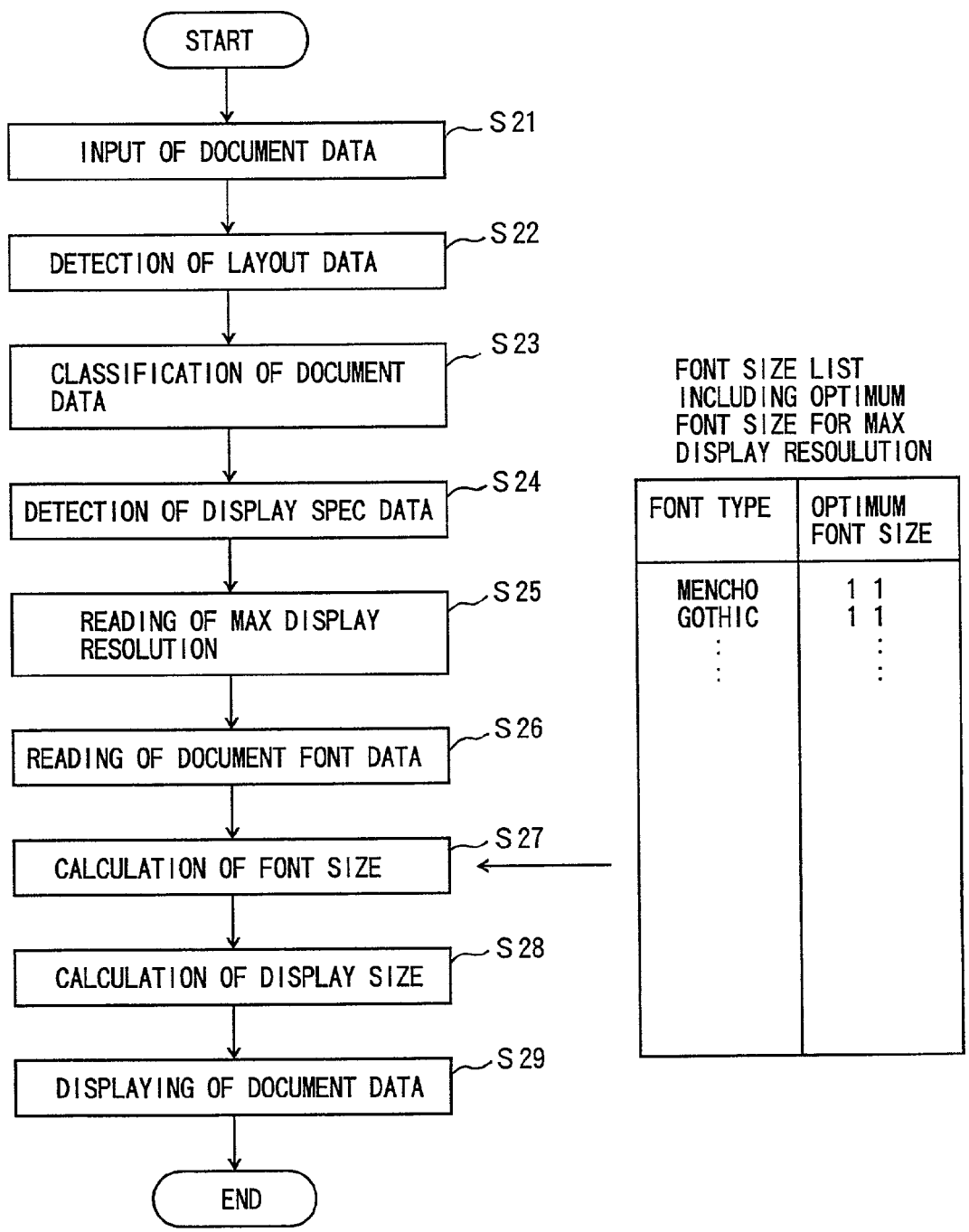
FIG. 10 is a flowchart for explaining a display format processing routine executed by a fourth preferred embodiment of the display system of the invention.

FIG. 10 is a flowchart for explaining a display format processing routine executed by a fourth preferred embodiment of the display system of the invention.

Figure 11:
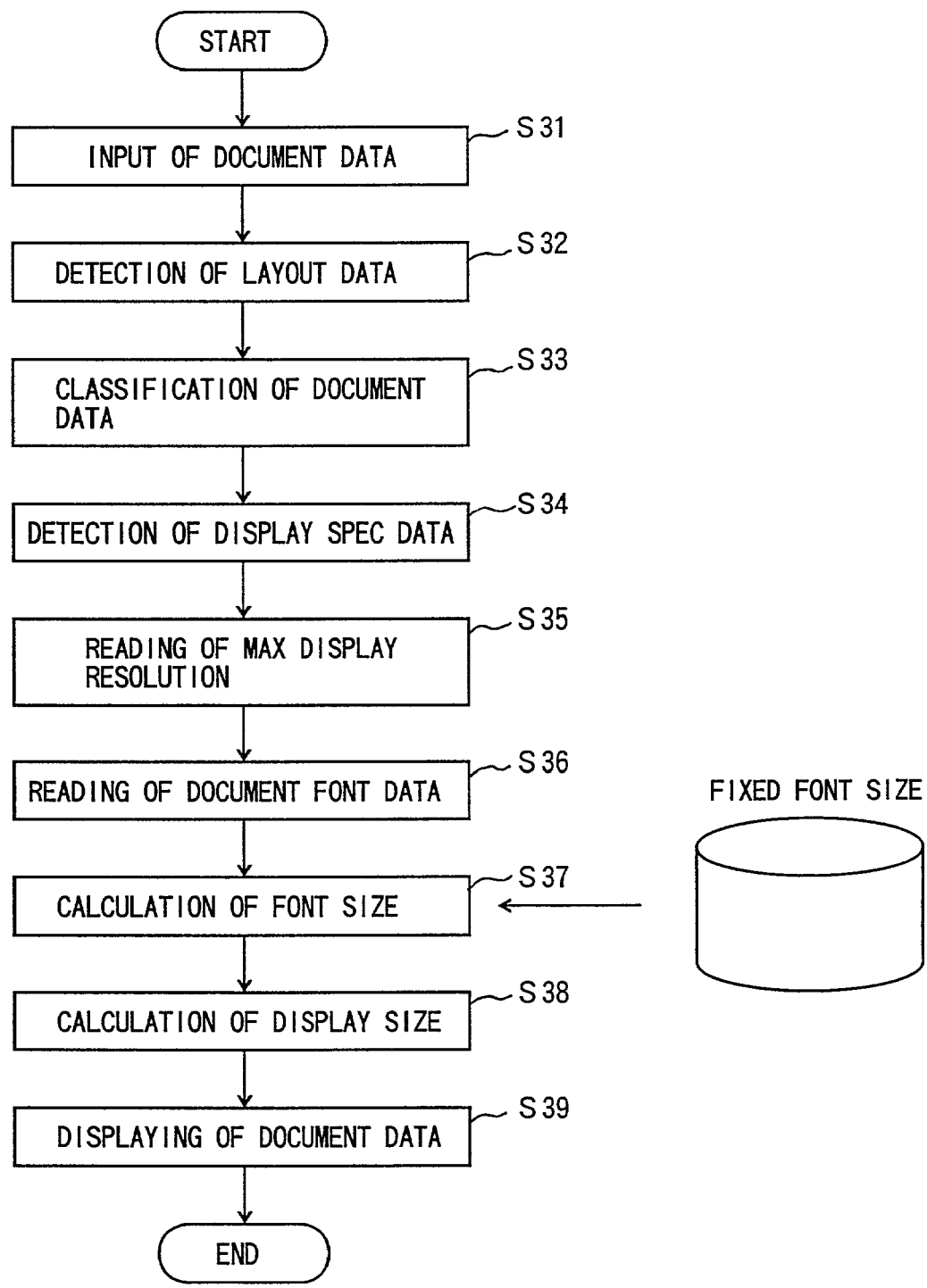
FIG. 11 is a flowchart for explaining another display format processing routine executed by the display system of the fourth preferred embodiment.
Figure 12:
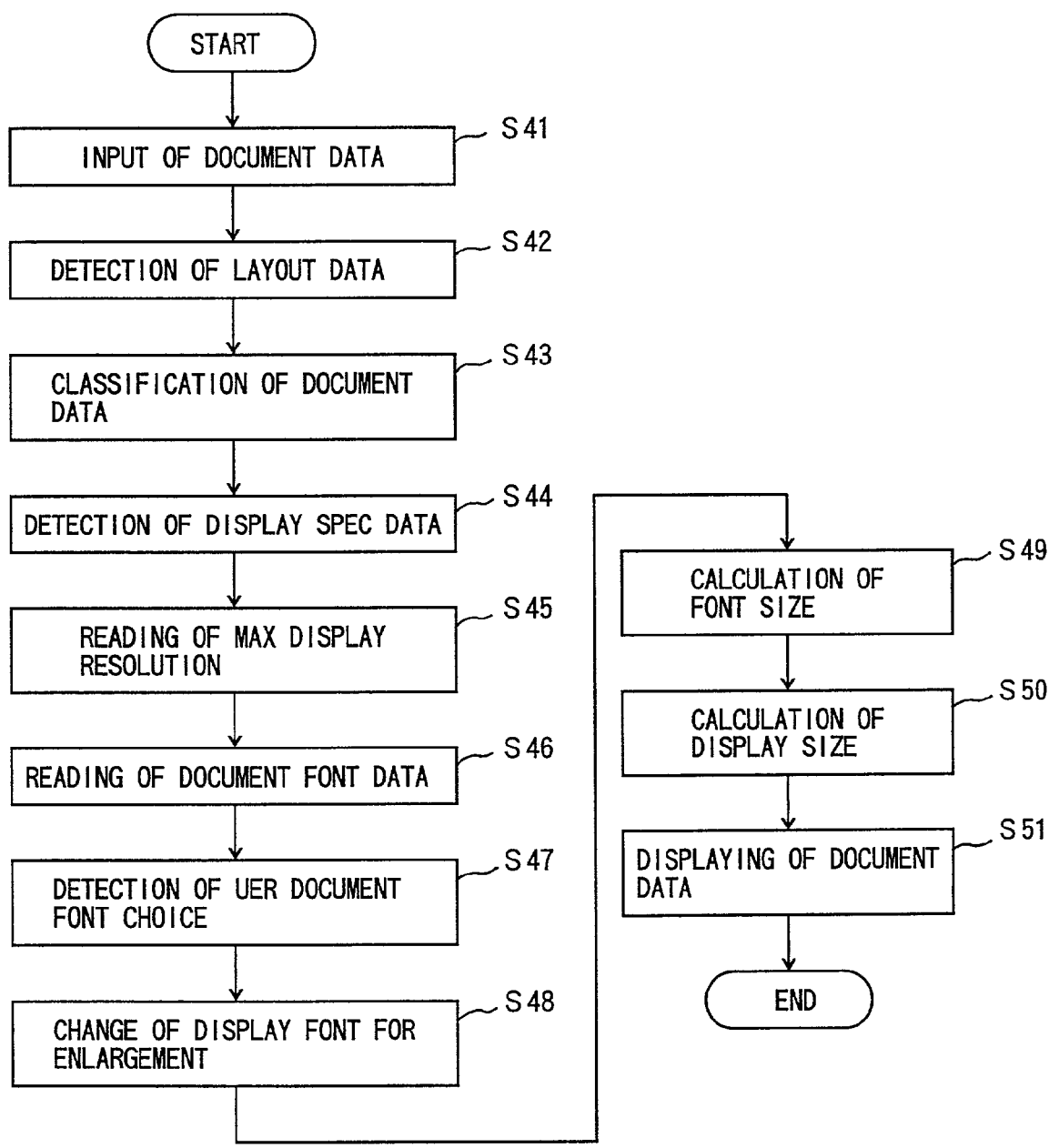
FIG. 12 is a flowchart for explaining another display format processing routine executed by the display system of the fourth preferred embodiment.

In the present embodiment, the elements of the display system are essentially the same as the corresponding elements of the display system 101 shown in FIG. 6, and a description thereof will be omitted. The display format processing routine of one of FIG. 10, FIG. 11 and FIG. 12 is constituted by program code instructions stored in a memory of the CPU 26 or the storage device 23. In the present embodiment, the memory of the CPU 26 or the storage device 23 corresponds to a computer readable medium. Alternatively, other types of computer usable devices and media may be used as a computer readable medium. Further, in the display system 101 of the present embodiment, the program code instructions, stored in the memory of the CPU 26 or the storage device 23 (the computer readable medium), cause the CPU 26 to execute the display format processing routine of one of FIG. 10, FIG. 11 and FIG. 12.

As shown in FIG. 10, at a start of the display format processing routine, the CPU 26 at step S21 inputs an original document data that is received from the document data source 24. After the document data is inputted, the CPU 26 at step S22 detects the layout data from the document data. After the layout data is detected, the CPU 26 at step S23 identifies the text/image data elements through classification of the document data. After the text/image data elements are identified, the CPU 26 at step S24 detects the display specification data that is stored in the storage device 23.

The CPU 26 at step S25 reads out a maximum display resolution from the display specification data detected at the step S24. After the maximum display resolution is read out, the CPU at step S26 reads out a document font data from the text data elements obtained at the step S23. In the present embodiment, a font size list including an optimum font size of a displayed text data for the maximum display resolution of the display unit 21 is created based on the maximum display resolution (obtained at the step S25) and the document font data (obtained at the step S26). The CPU 26 at step S27 calculates a font size of the displayed text data by using the font size list. In the step S27, it is necessary for the user to preset a desired font type of the font size list in the calculation of an appropriate font size of the displayed text data.

After the font size of the displayed text data is calculated, the CPU 26 at step S28 calculates a display size that is appropriate for the text data elements to be readable on the screen of the display unit 21, based on the calculated font size (step S27). After the step S28 is performed, the CPU 26 at step S29 produces a processed document data that reflects the display size calculated at the step S28, and stores the resulting document data into the storage device 23. Further, in the step S29, the CPU 26 receives the processed document data from the storage device 23, and supplies the processed document data to the display memory 22 in the display device 20, so that the document data is displayed on the display unit 21 in conformity with the display specification data and the layout data.

The display system of the above-described embodiment can provide the user with an appropriate font size of the displayed text data when viewing the document data displayed on the screen of the display unit 21.

FIG. 11 is a flowchart for explaining another display format processing routine executed by the display system of the fourth preferred embodiment.

As shown in FIG. 11, at a start of the display format processing routine, the CPU 26 at step S31 inputs an original document data that is received from the document data source 24. After the document data is inputted, the CPU 26 at step S32 detects the layout data from the document data. After the layout data is detected, the CPU 26 at step S33 identifies the text/image data elements through classification of the document data. After the text/image data elements are identified, the CPU 26 at step S34 detects the display specification data that is stored in the storage device 23.

The CPU 26 at step S35 reads out a maximum display resolution from the display specification data detected at the step S34. After the maximum display resolution is read out, the CPU at step S36 reads out a document font data from the text data elements obtained at the step S33. In the present embodiment, a fixed font size list including a fixed font size of a displayed text data for a general-purpose display unit is predetermined. The CPU 26 at step S37 calculates an appropriate font size of the displayed text data through making reference to the fixed font size based on the maximum display resolution of the display unit 21 (obtained at the step S35) and the document font data (obtained at the step S36). It is unnecessary for the user to preset a desired font type in the calculation of an appropriate font size of the displayed text data.

After the font size of the displayed text data is calculated, the CPU 26 at step S38 calculates a display size that is appropriate for the text data elements to be readable on the screen of the display unit 21, based on the calculated font size (step S37). After the step S38 is performed, the CPU 26 at step S39 produces a processed document data that reflects the display size calculated at the step S38, and stores the resulting document data into the storage device 23. Further, in the step S39, the CPU 26 receives the processed document data from the storage device 23, and supplies the processed document data to the display memory 22 in the display device 20, so that the document data is displayed on the display unit 21 in conformity with the display specification data and the layout data.

The display system of the above-described embodiment can provide the user with an appropriate font size of the displayed text data when viewing the document data displayed on the screen of the display unit 21.

FIG. 12 is a flowchart for explaining another display format processing routine executed by the display system of the fourth preferred embodiment.

As shown in FIG. 12, at a start of the display format processing routine, the CPU 26 at step S41 inputs an original document data that is received from the document data source 24. After the document data is inputted, the CPU 26 at step S42 detects the layout data from the document data. After the layout data is detected, the CPU 26 at step S43 identifies the text/image data elements through classification of the document data. After the text/image data elements are identified, the CPU 26 at step S44 detects the display specification data that is stored in the storage device 23.

The CPU 26 at step S45 reads out a maximum display resolution from the display specification data detected at the step S44. After the maximum display resolution is read out, the CPU at step S46 reads out a document font data from the text data elements obtained at the step S43. In the present embodiment, the user is allowed to input, from the operation unit 27, a user's choice for a document font size that is appropriate to make the displayed text data readable to the user, to the CPU 26. The CPU 26 at step S47 detects the user's document font choice that is inputted from the operation unit 27. The CPU 26 at step S48 changes the document font size to a display font size for enlargement according to the user's document font choice. The CPU 26 at step S49 calculates an appropriate font size of the displayed text data based on the display font size obtained at the step S48.

After the appropriate font size of the displayed text data is calculated, the CPU 26 at step S50 calculates a display size that is appropriate for the text data elements to be readable on the screen of the display unit 21, based on the calculated font size (step S49). After the step S50 is performed, the CPU 26 at step S51 produces a processed document data that reflects the display size calculated at the step S50, and stores the resulting document data into the storage device 23. Further, in the step S51, the CPU 26 receives the processed document data from the storage device 23, and supplies the processed document data to the display memory 22 in the display device 20, so that the document data is displayed on the display unit 21 in conformity with the display specification data and the layout data.

The display system of the above-described embodiment can provide the user with an appropriate font size of the displayed text data when viewing the document data displayed on the screen of the display unit 21. The user can input a desired document font size that is appropriate to make the displayed text data readable, from the operation unit 27 to the CPU 26.

Figure 13:
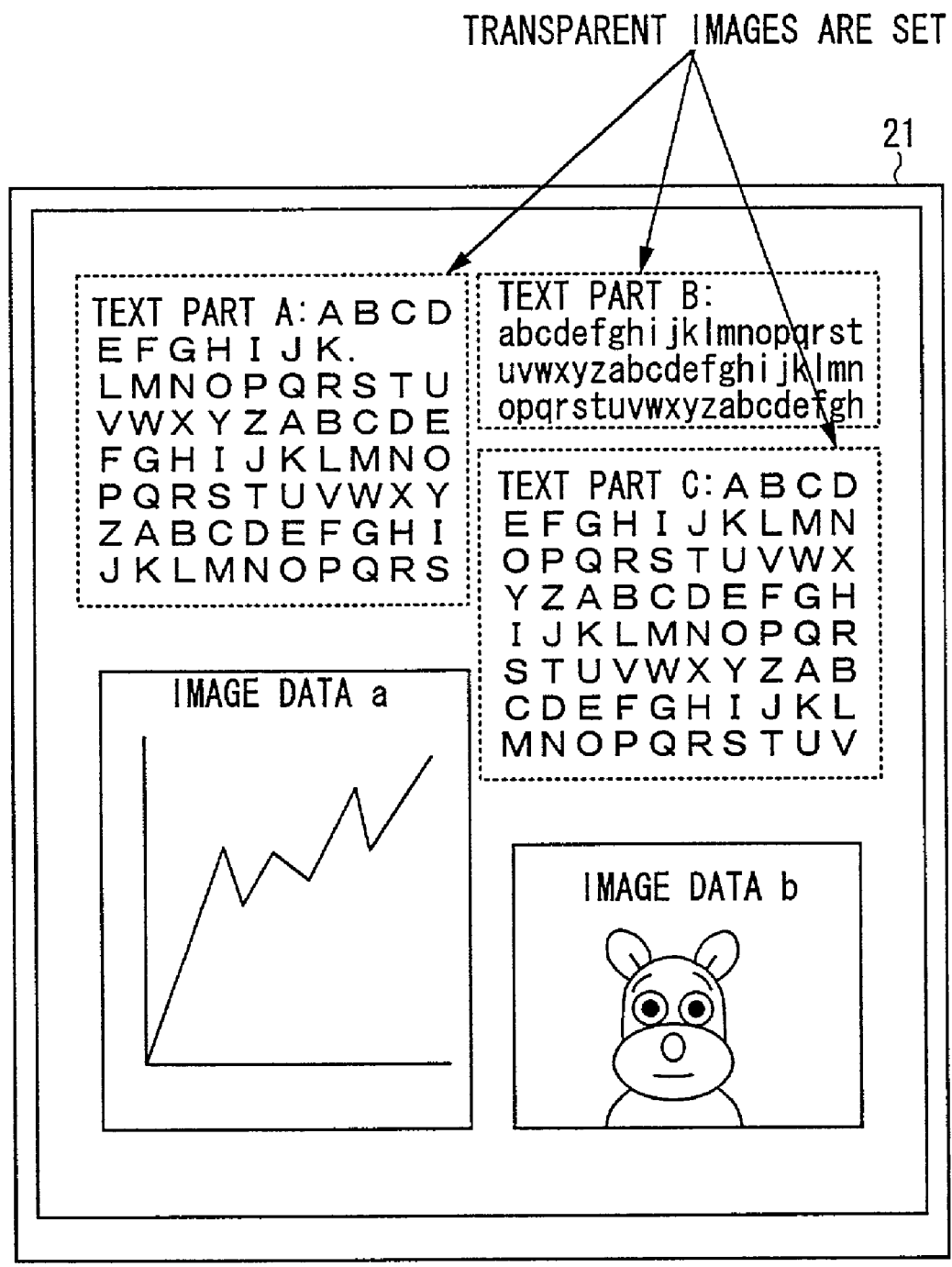
FIG. 13 is a diagram for explaining a display screen switching of a fifth preferred embodiment of the display system of the invention.

FIG. 13 shows a display screen switching of a fifth preferred embodiment of the display system of the invention in which transparent images are set for data elements of a document data.

In the display system of the present embodiment, the display unit 21 is configured to include a touch panel screen, and transparent images corresponding to the text data elements of a document data on the touch panel screen are set. As shown in FIG. 13, rectangular areas corresponding to the text data elements "A", "B" and "C" of the document data on the touch panel screen of the display unit 21 are designated as the transparent images. When one of the transparent images on the touch panel screen of the display unit 21 is touched by the user, the displaying of the document data is switched to the enlarged view of the selected text data element as shown on the right side of one of FIG. 7, FIG. 8 and FIG. 9.

Figure 14:
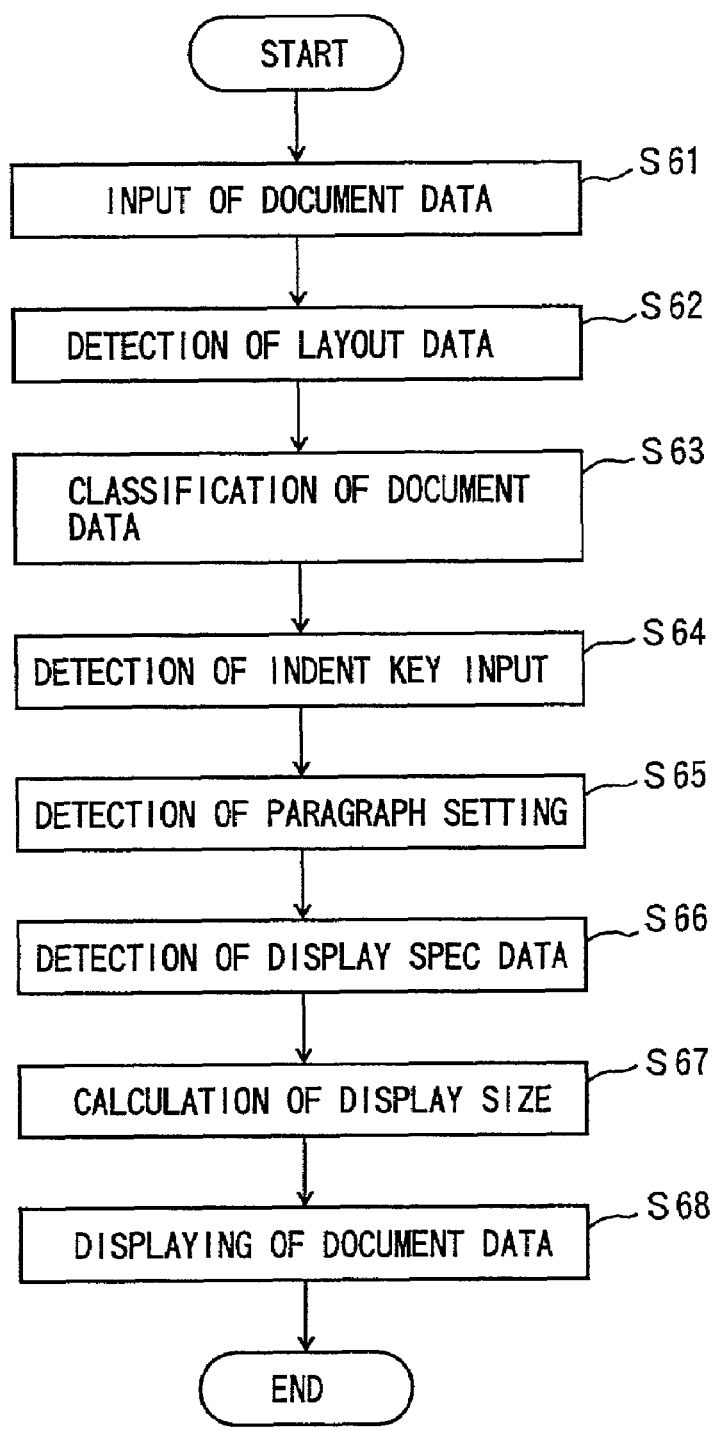
FIG. 14 is a flowchart for explaining a text data paragraph setting routine executed by a sixth preferred embodiment of the display system of the invention.

FIG. 14 is a flowchart for explaining a text data paragraph setting routine executed by a sixth preferred embodiment of the display system of the invention.

In the present embodiment, the elements of the display system are essentially the same as the corresponding elements of the display system 101 shown in FIG. 6, and a description thereof will be omitted. The text data paragraph setting routine of FIG. 14 is constituted by program code instructions stored in a memory of the CPU 26 or the storage device 23. In the present embodiment, the memory of the CPU 26 or the storage device 23 corresponds to a computer readable medium. Alternatively, other types of computer usable devices and media may be used as a computer readable medium. Further, in the display system 101 of the present embodiment, the program code instructions, stored in the memory of the CPU 26 or the storage device 23 (the computer readable medium), cause the CPU 26 to execute the text data paragraph setting routine of FIG. 14.

As shown in FIG. 14, at a start of the text data paragraph setting routine, the CPU 26 at step S61 inputs an original document data that is received from the document data source 24. After the document data is inputted, the CPU 26 at step S62 detects the layout data from the document data. After the layout data is detected, the CPU 26 at step S63 identifies the text/image data elements through classification of the document data. After the text/image data elements are identified, the CPU 26 at step S64 detects individual indent key inputs of a selected one of the text data elements of the document data. The selection of the text data element from the document data may be made according to the user's demand. With respect to each of the indent key inputs detected at the step S64, the CPU 26 at step S65 performs paragraph setting of the selected text data element.

After the step S65 is performed, the CPU 26 at step S66 detects the display specification data that is stored in the storage device 23. The CPU 26 at step S67 calculates a display size that is appropriate for the text data elements to be readable on the screen of the display unit 21, based on the display specification data (obtained at the step S66) and the text data elements (obtained at the step S63). After the step S67 is performed, the CPU 26 at step S68 produces a processed document data that reflects the display size calculated at the step S67, and stores the resulting document data into the storage device 23. Further, in the step S68, the CPU 26 receives the processed document data from the storage device 23, and supplies the processed document data to the display memory 22 in the display device 20, so that the document data is displayed on the display unit 21 in conformity with the display specification data and the layout data.

Figure 15:
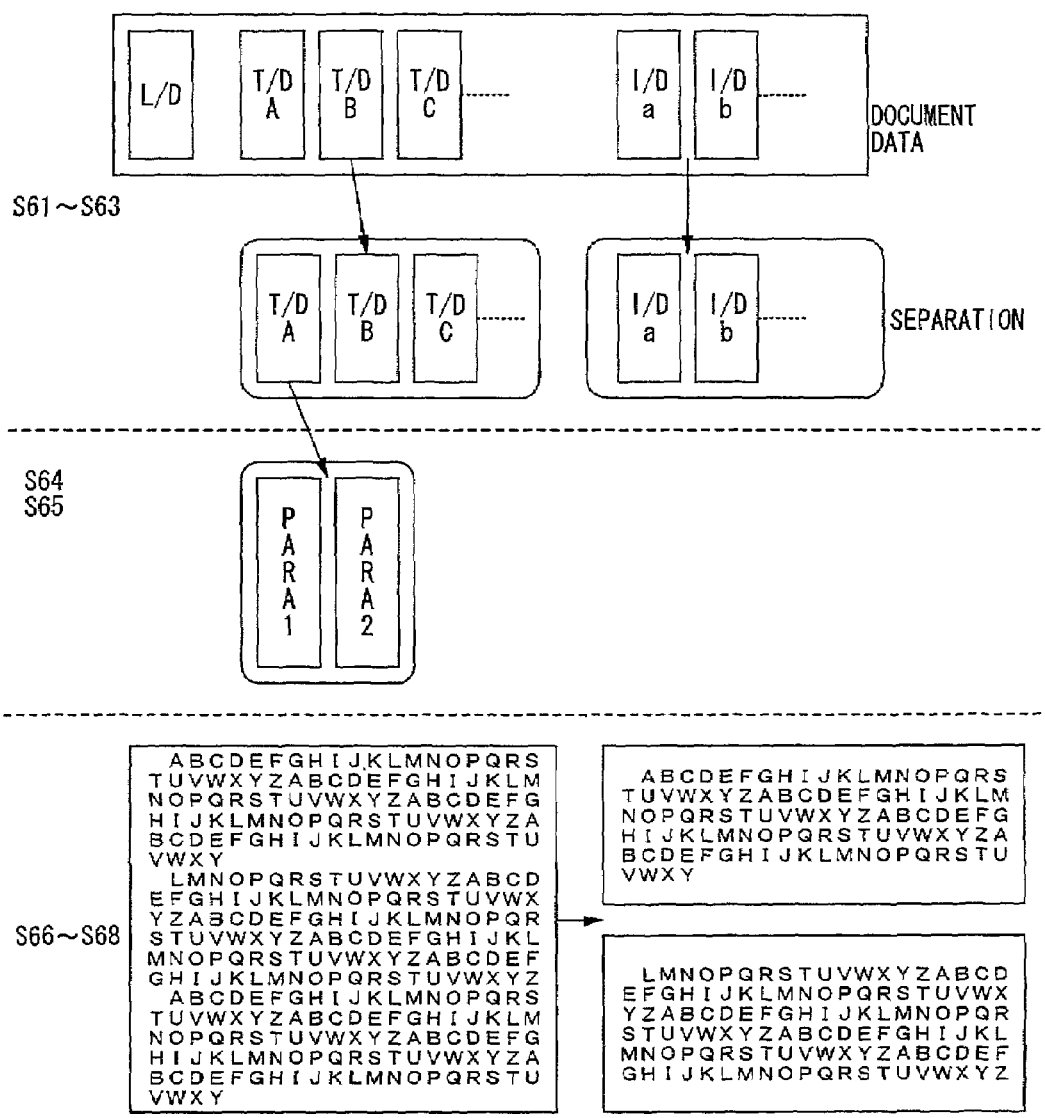
FIG. 15 is a diagram for explaining the text data paragraph setting routine of the sixth preferred embodiment.

FIG. 15 is a diagram for explaining the text data paragraph setting routine of the sixth preferred embodiment. As shown in FIG. 15, in the steps S61 through S63 of the routine of FIG. 14, the CPU 26 detects the layout data (L/D)

from the document data, and identifies the respective text/image data elements of the document data from the detected layout data. Suppose that, in the example of FIG. 15, the document data includes the text data elements (T/D) "A" through "C" and the image data elements (I/D) "a" and "c". In the step S63, the CPU 26 separates the image data elements "a" and "c" from the text data elements "A" through "C". In the present embodiment, the CPU 26 takes no action for the image data elements "a" and "c".

Suppose that, in the example of FIG. 15, the text data element "A" is selected by the user from among the text data elements "A" through "C". With respect to the selected one of the text data elements "A" through "C", the CPU 26 performs the steps S64 and S65. The CPU 26 at the step S64 detects individual indent key inputs of the selected text data element "A". With respect to each of the indent key inputs detected at the step S64, the CPU 26 at the step S65 performs paragraph setting of the selected text data element "A". In the example of FIG. 15, the text data element "A" is separated into two paragraphs "PARA1" and "PARA2".

After the step S65 is performed, the CPU 26 at the step S66 detects the display specification data that is stored in the storage device 23. The CPU 26 at the step S67 calculates the display size that is appropriate for the text data elements to be readable on the screen of the display unit 21. After the step S67 is performed, the CPU 26 at the step S68 controls the display device 20 so that the document data is displayed on the display unit 21 in conformity with the display specification data and the layout data. In the example of FIG. 15, the two paragraphs of the text data element "A" are separately displayed on the display unit 32.

In the display system of the above-described embodiment, when the text data element is too large in size to be displayed on the screen of the display unit 21, it can provide the user with an appropriate paragraph setting and an appropriate display size of the displayed text data when viewing it on the screen of the display unit 21.

Figure 16:
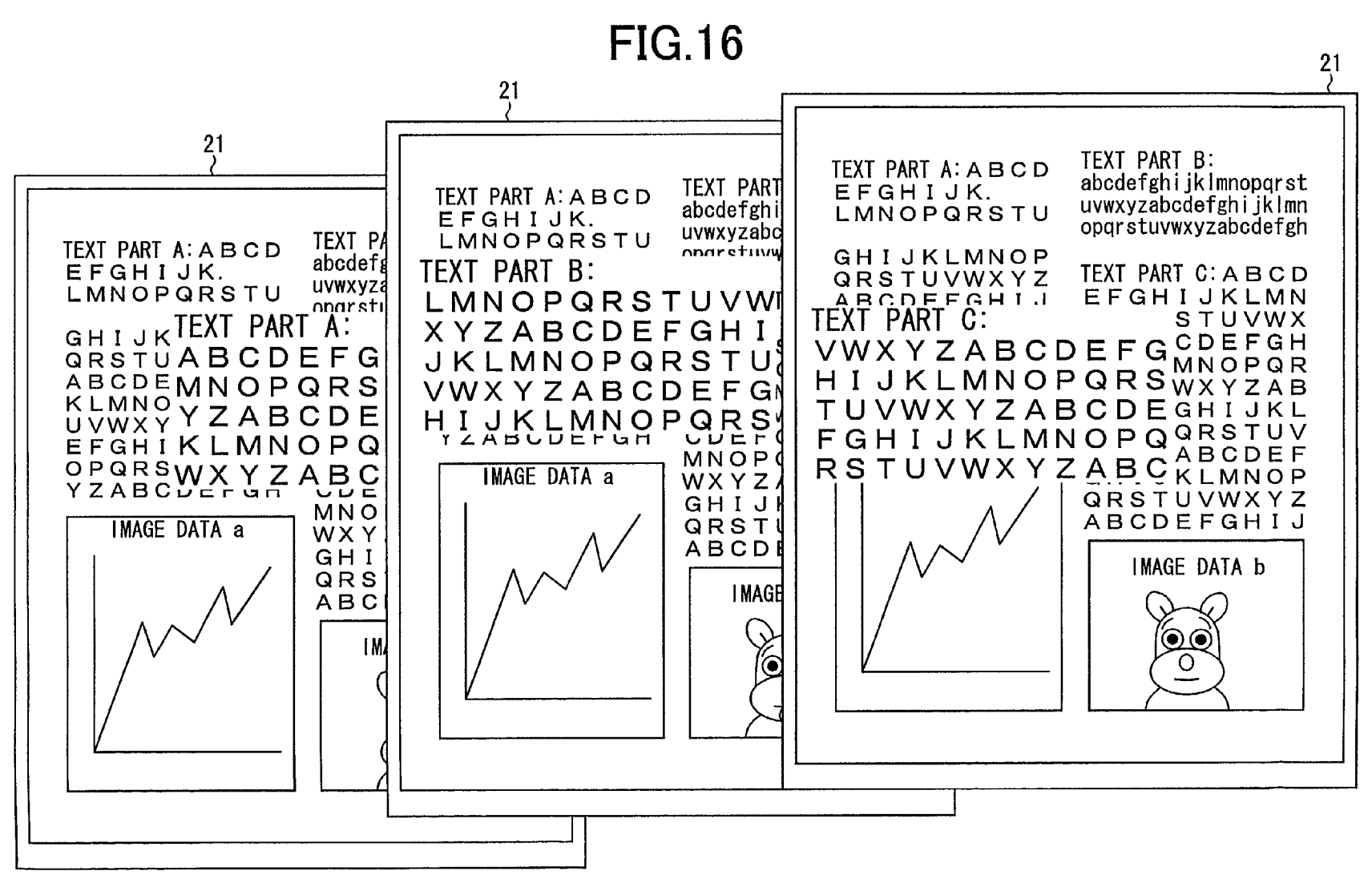

FIG. 16 shows a data element layer display control processing of a seventh preferred embodiment of the display system of the invention.

In the present embodiment, the CPU 26 controls the display unit 21 such that an image of at least one of the data elements of a document data with a calculated display size, overlapped over a background image of the entire document data with an original display size, is displayed on the display unit 21. Further, the CPU 26 selects one of the data elements, which is displayed with the calculated display size on the display unit 21, in response to the user's demand, so that an image of the selected one of the data elements, overlapped over the background image of the entire document data with the original display size, appears with the calculated display size on the display unit 21.

As shown in FIG. 16, in a display example on the left side, the text data element "A" is selected according to the user's demand, and the CPU 26 controls the display unit 21 such that an image ("TEXT PART A") of the selected text data element "A", overlapped over the background image of the entire document data with the original display size, appears with the calculated display size on the display unit 21. In a display example in the middle, the text data element "B" is selected according to the user's demand, and the CPU 26 controls the display unit 21 such that an image ("TEXT PART B") of the selected text data element "B", overlapped over the background image of the entire document data with the original display size, appears with the calculated display size on the display unit 21. In a display example on the right side, the text data element "C" is selected according to the user's demand, and the CPU 26 controls the display unit 21 such that an image ("TEXT PART C") of the selected text data element "C", overlapped over the background image of the entire document data with the original display size, appears with the calculated display size on the display unit 21.

In the above-described embodiment, the user can select arbitrary one of the data elements of the document data, which is displayed with the calculated display size on the display unit 21. Therefore, the display system and the display control method of the present embodiment are effective in improving the document displaying capabilities.

FIG. 17 shows another data element layer display control processing of the display system of the seventh preferred embodiment.

Similar to the embodiment of FIG. 16, in the present embodiment, the CPU 26 controls the display unit 21 such that an image of at least one of the data elements of a document data with a calculated display size, overlapped over a background image of the entire document data with an original display size, is displayed on the display unit 21. Further, the CPU 26 selects one of the data elements, which is displayed with the calculated display size on the display unit 21, in response to the user's demand, so that an image of the selected one of the data elements, overlapped over the background image of the entire document data with the original display size, appears with the calculated display size on the display unit 21.

As shown in FIG. 17, in a display example on the top, a background image of the entire document data with an original display size is displayed on the display unit 21. In a display example on the bottom, the text data elements "A", "B" and "C" are selected according to the user's demand, and the CPU 26 controls the display unit 21 such that respective images of the selected text data elements "A" through "C", overlapped over the background image of the entire document data with the original display size, appear at a time with the calculated display size on the display unit 21.

In the above-described embodiment, the user can select all of the data elements of the document data, which are displayed at a time with the calculated display size on the display unit 21. Therefore, the display system and the display control method of the present embodiment are effective in improving the document displaying capabilities.

The present invention is not limited to the above-described embodiments, and variations and modifications may be made without departing from the scope of the present invention.

What is claimed is:

1. A display system in which a processed document data from original document data, in conformity with a display specification data stored in a storage device and a layout data contained in the original document data, is displayed on a display unit, comprising:

an interface coupled to receive the original document data;

a central processing unit comprising a display specification detection unit detecting a display specification data related to the display unit, the display specification data representing specifications of the display unit;

a layout data detection unit detecting the layout data of the original document data, identifying text/image data elements through classification of the original document data, reading a maximum display resolution from text data elements, including an optimum font size;

an operation unit utilized by a user to input a desired font type;

wherein the central processing unit reads document font data, calculates a font size of displayed text data in accordance with readability of the displayed text data, calculates a display size based on the calculated font size, generates the processed document data that reflects the display size calculated and the calculated font size in the desired font type, stores the processed document data into the storage device, transfers the processed document data from the storage device to the central processing unit, and supplies the processed document data to a display memory in the display unit so that the document data is displayed on the display unit in conformity with the display specification data and the layout data;

the display memory storing the processed document data so that a document is displayed on the display unit in accordance with the processed document data; and a display control unit facilitating switching between controlling a display layout of the display unit based on the detected display specification data and the detected layout data, so that a display size of text data elements in the document data is readable when being displayed on the display unit and controlling the display unit based on user input such that an image of at least one portion of the display layout is displayed on the display unit with a user-determined display size.

2. The display system according to claim 1, wherein the display control unit controls the display unit such that respective positions of the data elements, displayed on the display unit, are in conformity with the layout data integrally stored with the document data.

3. The display system according to claim 1, wherein the display control unit controls the display unit such that the entire document data is displayed on the display unit with an original display size.

4. The display system according to claim 1, wherein the display control unit selects one of a first display method and a second display method, the display unit being controlled, when the first display method is selected, such that the entire document data is displayed on the display unit with an original display size, and the display unit being controlled, when the second display method is selected, such that at least one of the data elements of the document data is displayed with the user-determined display size on the display unit.

5. The display system according to claim 1, wherein the display control unit controls the display unit such that an image of at least one of the data elements with the user-determined display size, overlapped over a background image of the entire document data with an original display size, is displayed on the display unit.

6. The display system according to claim 1, wherein the display unit includes a display screen on which a pointer is movably located, and the display control unit selects one of a first display method and a second display unit in response to a user input that is designated by the pointer on the display screen.

7. The display system according to claim 1, wherein the display unit includes a touch panel screen, and the display control unit selects one of a first display method and a second display unit in response to a user input that is designated on the touch panel screen.

8. The display system according to claim 5, wherein the display control unit selects one of the data elements, which is displayed with the user-determined display size on the display unit, in response to a user input, so that an image of the selected one of the data elements, overlapped over the background image of the entire document data with the original display size, appears on the display unit.

9. The display system according to claim 1, wherein the display control unit calculates a font size of a displayed text data by using a font size list including an optimum font size for a maximum display resolution read from the display specification data of the display unit and created based on the maximum display resolution and a document font data read from text data elements of the document data.

10. A method of controlling a display system in which a processed document data from original document data, in conformity with a display specification data stored in a storage device and a layout data contained in the original document data, is displayed on a display unit, comprising:

inputting the original document data;

detecting the layout data from the original document data;

identifying text/image data elements through classification of the original document data;

detecting the display specification data that is stored in the storage device, the display specification data representing specifications of the display unit;

reading a maximum display resolution from text data elements, including an optimum font size;

reading document font data;

presetting, by the user, a desired font type;

calculating a font size of displayed text data in accordance with readability of the displayed text data;

calculating a display size based on the calculated font size;

generating the processed document data that reflects the display size calculated and the calculated font size in the desired font type;

storing the processed document data into the storage device;

transferring the processed document data from the storage device to a central processing unit;

supplying the processed document data to a display memory in the display unit so that the document data is displayed on the display unit in conformity with the display specification data and the layout data; and switching between controlling a display layout of the display unit based on the detected display specification data and the detected layout data, so that a readable display size is selected of text data elements in the document data when being displayed on the display unit and controlling the display unit based on user input such that an image of at least one portion of the display layout is displayed on the display unit with a user-determined display size.

11. The method according to claim 10, wherein controlling a display layout of the display unit further includes calculating a font size of a displayed text data by using a font size list including an optimum font size for a maximum display resolution read from the display specification data of the display unit and created based on the maximum display resolution and a document font data read from text data elements of the document data.

12. A computer readable medium storing display control program code instructions for causing a processor to control a display system in which a processed document data from original document data, in conformity with a display specification data stored in a storage device and a layout data contained in the original document data, is displayed on a display unit, comprising:

an initial program code means to cause the processor to receive the original document data;

first program means to cause the processor to detect a display specification data related to the display unit, the display specification data representing specifications of the display unit;

second program code means to cause the processor to detect the layout data of the original document data, identify text/image data elements through classification of the original document data, read a maximum display resolution from text data elements, including an optimum font size, third program code means to facilitate input of a desired font type by a user;

fourth program code means to read document font data, calculate a font size of displayed text data in accordance with readability of the displayed text data, calculate a display size based on the calculated font size, generates the processed document data that reflects the display size calculated and the calculated font size in the desired font type, store the processed document data into the storage device, transfer the processed document data from the storage device to the central processing unit, and supply the processed document data to a display memory in the display unit so that the document data is displayed on the display unit in conformity with the display specification data and the layout data;

fifth program code storing the processed document data so that a document is displayed on the display unit in accordance with the processed document data; and sixth program code facilitating switching between controlling a display layout of the display unit based on the detected display specification data and the detected layout data, so that a display size is appropriate for readability of text data elements in the document data is readable when being displayed on the display unit and controlling the display unit based on user input such that an image of at least one portion of the display layout is displayed on the display unit with a user-determined display size.

13. The computer readable medium of claim 12, wherein the third program code means calculates a font size of a displayed text data by using a font size list including an optimum font size for a maximum display resolution read from the display specification data of the display unit and created based on the maximum display resolution and a document font data read from text data elements of the document data.

14. A display system in which a processed document data from original document data, in conformity with a display specification data stored in a storage device and a layout data contained in the original document data, is displayed on a monitor of a display unit, comprising:

a central processing unit comprising:

a display specification detection unit detecting a display specification data related to the display unit, the display specification data representing specifications of the display unit;

a layout data detection unit detecting the layout data of the original document data, identifying text/image data elements through classification of the original document data, reading a maximum display resolution from text data elements, including an optimum font size;

an operation unit utilized by a user to input a desired font type;

the display memory storing the processed document data so that a document is displayed on the display unit in accordance with the processed document data, wherein the central processing unit reads document font data, calculates a font size of displayed text data in accordance with readability of the displayed text data, calculates a display size based on the calculated font size, generates the processed document data that reflects the display size calculated and the calculated font size in the desired font type, stores the processed document data into the storage device, transfers the processed document data from the storage device to the central processing unit, and supplies the processed document data to a display memory in the display unit so that the document data is displayed on the display unit in conformity with the display specification data and the layout data, such that data elements of the processed document data displayed on the monitor are allocated on the monitor according to a user-determined display layout based on the detected display specification data and the detected layout data page, and layout processing is carried out for data elements of the processed document data; and a display control unit facilitating switching between controlling the display layout of the display unit based on the detected display specification data and the detected layout data, so that a display size is appropriate for readability of text data elements in the processed document data when being displayed on the monitor and controlling the display unit, based on user input, such that an image of at least one portion of the display layout is displayed on the display unit with a user-determined display size.

15. A display system in which a processed document data from original document data, in conformity with a display specification data stored in a storage device and a layout data contained in the original document data, is displayed on a display unit, comprising:

a display device, comprising:

the display unit, receiving processed document data from a display memory;

a display memory storing a processed document data so that a document is displayed on the display unit in accordance with the processed document data, wherein when a first display method is selected, an entire document data is displayed on the display unit with an original display size, and when the second display method is selected, at least one of the data elements of the document data is displayed with a user-determined display size on the display unit;

a memory storing layout data, text data elements, and image data elements and display specification data;

a central processing unit receiving the original document data, processing the original document data to provide layout data of the original document data, identify text/image data elements through classification of the original document data, read a maximum display resolution from text data elements, including an optimum font size, wherein the layout data contain layout information, comprised of data element identifiers, data element positions and page format data and are integrally stored with the document data and represent a page layout of data elements of the document data that are displayed, text data elements, and image data elements, and storing the layout data, text data elements, and image data elements in the memory detecting a display specification data related to the display unit, the display specification data representing specifications of the display unit, storing the display specification data in the memory, detecting display method instructions from a user, and selecting a display method based on user instructions; and an operation unit utilized by a user to input a desired font type;

wherein the central processing unit reads document font data, calculates a font size of displayed text data in accordance with readability of the displayed text data, calculates a display size based on the calculated font size, generates the processed document data that reflects the display size calculated and the calculated font size in the desired font type, stores the processed document data into the storage device, transfers the processed document data from the storage device to the central processing unit, and supplies the processed document data to a display memory in the display unit so that the document data is displayed on the display unit in conformity with the display specification data and the layout data and switches between controlling a display layout of the display unit based on the display specification data and the layout data, so that a display size is appropriate for readability of text data elements in the document data when being displayed on the display unit and controlling the display unit, based on user input, such that an image of at least one portion of the display layout is displayed on the display unit with a user-determined display size.

* * * * *